(12) United States Patent
Kim et al.

(10) Patent No.: US 8,984,036 B2
(45) Date of Patent: Mar. 17, 2015

(54) METHODS FOR OPERATING CONTROLLERS USING SEED TABLES

(75) Inventors: Yong June Kim, Seoul (KR); Jung Soo Chung, Seoul (KR); Jun Jin Kong, Yongin-si (KR); Hongrak Son, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 322 days.

(21) Appl. No.: 13/547,212

(22) Filed: Jul. 12, 2012

(65) Prior Publication Data

US 2013/0018934 A1    Jan. 17, 2013

(30) Foreign Application Priority Data

Jul. 15, 2011    (KR) .................. 10-2011-0070472

(51) Int. Cl.
*G06F 7/58*    (2006.01)
(52) U.S. Cl.
CPC ..................................... *G06F 7/582* (2013.01)
USPC ........................................ 708/252; 708/250
(58) Field of Classification Search
USPC ................................................. 708/250–256
See application file for complete search history.

(56) References Cited

U.S. PATENT DOCUMENTS

| | | | | |
|---|---|---|---|---|
| 5,416,783 A | * | 5/1995 | Broseghini et al. | 714/728 |
| 6,549,446 B2 | * | 4/2003 | Morley et al. | 365/97 |
| 7,512,645 B2 | * | 3/2009 | Pitz et al. | 708/250 |
| 2009/0204824 A1 | * | 8/2009 | Lin et al. | 713/193 |
| 2009/0323942 A1 | * | 12/2009 | Sharon et al. | 380/44 |
| 2010/0229007 A1 | | 9/2010 | Park | |

FOREIGN PATENT DOCUMENTS

| | | |
|---|---|---|
| JP | 2006308522 A | 11/2006 |
| JP | 2008058514 A | 3/2008 |
| JP | 2008059177 A | 3/2008 |
| KR | 20100099961 A | 9/2010 |

* cited by examiner

*Primary Examiner* — Chat Do
*Assistant Examiner* — Calvin M Brien
(74) *Attorney, Agent, or Firm* — Harness, Dickey & Pierce, PLC

(57) ABSTRACT

A method for operating a controller may include storing a pseudo noise (PN) sequence provided from a PN sequence generator in an i-th area of a seed table and cyclically shifting the PN sequence from the i-th area to an (i+1)-th area in the table to form the table. The table may include row and column areas. A method for operating a controller may include receiving a sequence from a sequence generator, splitting the sequence into seed units, storing split sequences in a j-th area of the seed table, and forming the table including the seed units corresponding to the split sequences stored in the j-th area. A method for operating a controller may include storing a sequence provided from a sequence generator in a seed table that includes a plurality of areas and cyclically shifting the sequence in the table until a seed is formed in each area.

9 Claims, 13 Drawing Sheets

METHODS FOR OPERATING CONTROLLERS USING SEED TABLES

CROSS-REFERENCE TO RELATED APPLICATION(S)

This application claims priority from Korean Patent Application No. 10-2011-0070472, filed on Jul. 15, 2011, in the Korean Intellectual Property Office (KIPO), the entire contents of which are incorporated herein by reference.

BACKGROUND

1. Technical Field

Example embodiments may relate to methods for operating controllers. Example embodiments may relate to methods for operating controllers by forming a seed table and/or memory systems including the controller.

2. Description of the Related Art

Pseudo-random numbers are widely used in communication systems or data storage systems. The pseudo-random numbers are used to generate a pseudo-random sequence.

A pseudo-random number is a number that is generated by a predetermined mechanism, e.g., a pseudo-random number generator, using a given initial value.

Since a method of generating random numbers is not regulated, what value or number will be generated cannot be predicted. However, numbers generated by a pseudo-random number generator can be calculated from an initial value of the pseudo-random number generator. Accordingly, to distinguish these numbers from real random numbers, they are called pseudo-random numbers.

A linear feedback shift register (LFSR) is used to generate a pseudo-random sequence. The LFSR can change the pseudo-random sequence by changing an initial value referred to as a seed or changing feedback taps.

As described above, pseudo-random numbers can be calculated using an initial value. Accordingly, a method which does not allow pseudo-random numbers to be easily calculated is required.

A randomizer converts data to randomized data using a pseudo-random sequence generated by the LFSR. A de-randomizer converts randomized data into de-randomized data using the pseudo-random sequence generated by the LFSR. Accordingly, a randomizer or a de-randomizer that does not allow a pseudo-random sequence to be easily calculated is desired.

SUMMARY

In some example embodiments, a method for operating a controller may include storing a pseudo noise (PN) sequence provided from a PN sequence generator in an i-th area of a seed table and/or cyclically shifting the PN sequence from the i-th area to an (i+1)-th area in the seed table to form the seed table that includes at least one seed unit. The seed table may include a plurality of row areas and/or a plurality of column areas.

In some example embodiments, the plurality of row areas in the seed table may include the at least one seed unit.

In some example embodiments, the seed table may include seed units corresponding to a number of page addresses indicating a plurality of pages of at least one block in a non-volatile memory device.

In some example embodiments, a number of the column areas in the seed table may be equal to or greater than an order of a randomizer including at least one linear feedback shift register and/or one of the column areas may include binary bits corresponding to a number of page addresses indicating a plurality of pages of at least one block in a non-volatile memory device.

In some example embodiments, the i-th area may be at least one area among the column areas and/or the PN sequence stored in the i-th area may form a single column in the seed table.

In some example embodiments, a method for operating a controller may include receiving a sequence from a sequence generator, splitting the sequence into seed units, storing split sequences in a j-th area of the seed table, and/or forming the seed table including the seed units corresponding to the split sequences stored in the j-th area.

In some example embodiments, each of the seed units may include binary bits and/or a number of the binary bits may be equal to or greater than an order of a randomizer.

In some example embodiments, a memory system may include a non-volatile memory device, a pseudo noise (PN) sequence generator configured to provide a PN sequence, a seed table storage configured to store a seed table formed by performing cyclic shifts on the PN sequence, and/or a randomizer configured to randomize input data of the non-volatile memory device into random data and store the random data in the non-volatile memory device. The randomizer may include a random sequence generator configured to provide a random sequence with reference to the seed table stored in the seed table storage.

In some example embodiments, an electronic system may include a display, a memory system, and/or a processor configured to control the memory system and display data received from the memory system through the display. The memory system may include a non-volatile memory device and/or a memory controller configured to control the non-volatile memory device and include a randomizer which randomizes data stored in the non-volatile memory device. The memory controller may form a seed table including a seed unit used by the randomizer by performing cyclic shifts on a pseudo noise (PN) sequence generated by a PN sequence generator.

In some example embodiments, a memory card may include a non-volatile memory device, a card interface configured to communicate with a host, and/or a memory controller configured to control communication between the non-volatile memory device and the card interface. The memory controller may include a randomizer configured to randomize data stored in the non-volatile memory device, a pseudo noise (PN) sequence generator configured to provide a PN sequence, and/or a seed table storage configured to store a seed table including a seed unit formed by performing cyclic shifts on the PN sequence.

In some example embodiments, a method for operating a controller may include storing a sequence provided from a sequence generator in a seed table that includes a plurality of areas and/or cyclically shifting the sequence in the seed table until a seed is formed in each of the areas of the seed table. The seed table may include a plurality of row areas and a plurality of column areas.

In some example embodiments, the seed table may include a plurality of row areas.

In some example embodiments, the plurality of row areas may include at least one seed unit.

In some example embodiments, the least one seed unit may include binary bits.

In some example embodiments, cyclically shifting the sequence may shift the sequence cyclically from one row area to another row area.

In some example embodiments, cyclically shifting the sequence may shift the sequence cyclically from an i-th row area of the seed table to an (i+1)-th row area of the seed table.

In some example embodiments, the seed table may include a plurality of column areas.

In some example embodiments, cyclically shifting the sequence may shift the sequence cyclically from one column area to another column area.

In some example embodiments, cyclically shifting the sequence may shift the sequence cyclically from an i-th column area of the seed table to an (i+1)-th column area of the seed table.

In some example embodiments, the method may further include randomizing data of non-volatile memory cells using the seed table.

In some example embodiments, the data may be randomized in a row direction of the non-volatile memory cells.

In some example embodiments, the data may be randomized in a column direction of the non-volatile memory cells.

In some example embodiments, the data may be randomized in a row direction of the non-volatile memory cells and/or the data may be randomized in a column direction of the non-volatile memory cells.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
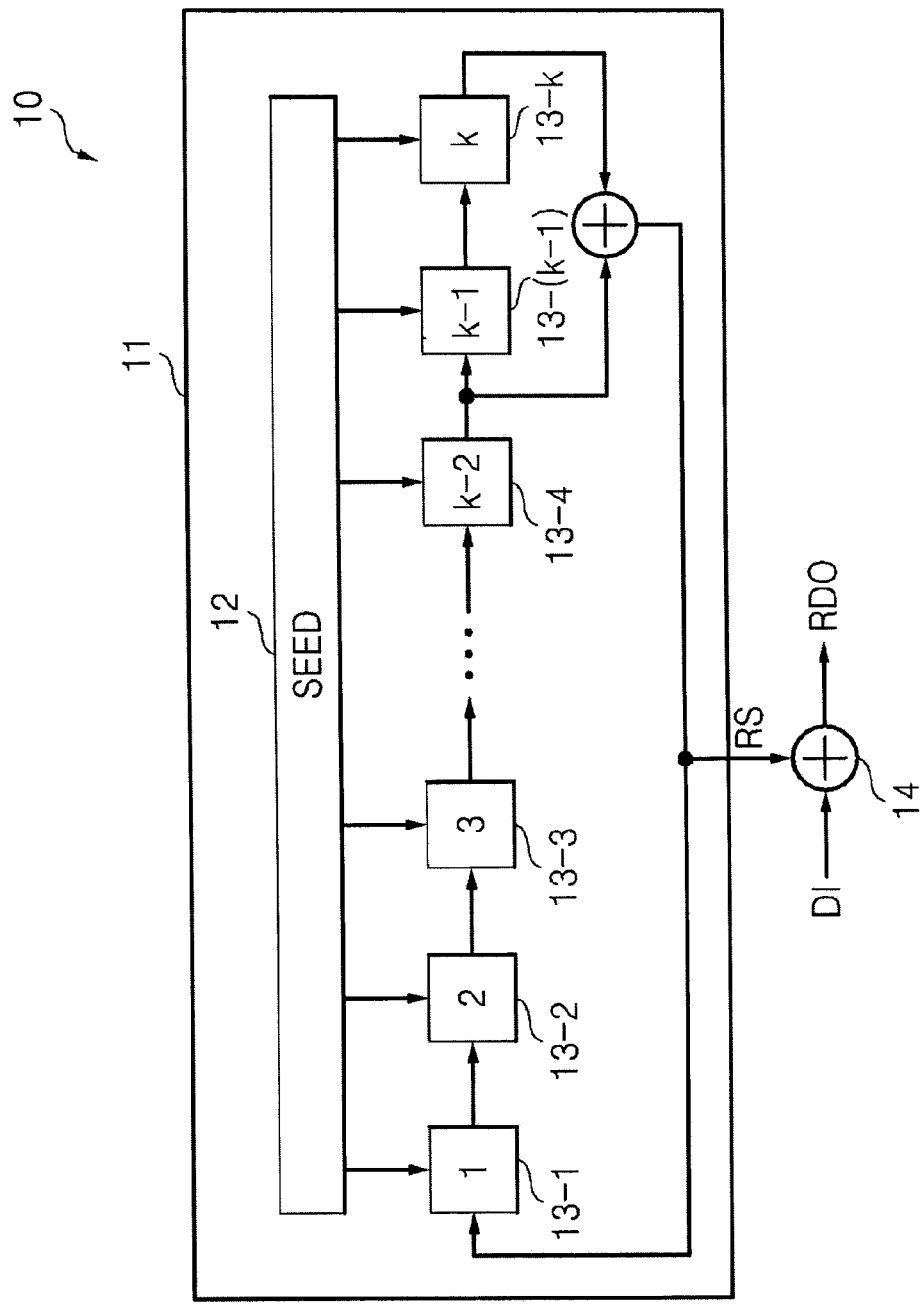
FIG. 1 is a block diagram of a conventional randomizer.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram of a conventional randomizer 10. The randomizer 10 includes a random sequence generator 11 and a logic gate 14.

The random sequence generator 11 includes a plurality of linear feedback shift registers (LFSRs) 13-1, 13-2, 13-3, ..., 13-4, 13-($k$-1), and 13-$k$. When there are k LFSRs 13-1 through 13-$k$, a random sequence RS may have a period of ($2^k$-1). Here, "k" also indicates the order of the randomizer 10. An initial value, i.e., a seed 12 is provided to each of the LFSRs 13-1 through 13-$k$. The random sequence generator 11 generates the random sequence RS using the seed 12 and provides the random sequence RS to the logic gate 14. The logic gate 14 is an exclusive OR (XOR) gate in the embodiments illustrated in FIG. 1 but is not restricted thereto. The logic gate 14 performs an XOR operation on the random sequence RS from the random sequence generator 11 and input data DI and generates random data RDO.

The randomizer 10 changes the input data DI so that the numbers of 1s and 0s in the input data DI are maintained constant stochastically. The increase in memory density may lead the increase in interference between memory cells. In other words, the interference may increase or decrease depending on the state of (i.e., a data value stored in) each of adjacent memory cells. Accordingly, the interference in a data value, i.e., a data pattern of each of the memory cells can be minimized by storing randomized data, i.e., random data in each memory cell.

Flash memory cells in non-volatile memory devices, e.g., flash memory devices may have interference such as program voltage disturbance, pass voltage disturbance, coupling between floating poly gates and/or back pattern dependency.

The randomizer 10 randomizes the input data DI using the random sequence RS to minimize interference between flash memory cells, thereby increasing the reliability of a non-volatile memory device. However, when the seed 12 is repeatedly used, there may be a problem in randomizing data patterns of non-volatile memory cells in a column direction although data patterns of non-volatile memory cells in a row direction are randomized.

The embodiments of the present invention relate to a method of forming a seed table including a plurality of seeds that enable data of non-volatile memory cells to be randomized in the column direction as well as the row direction.

Figure 2:
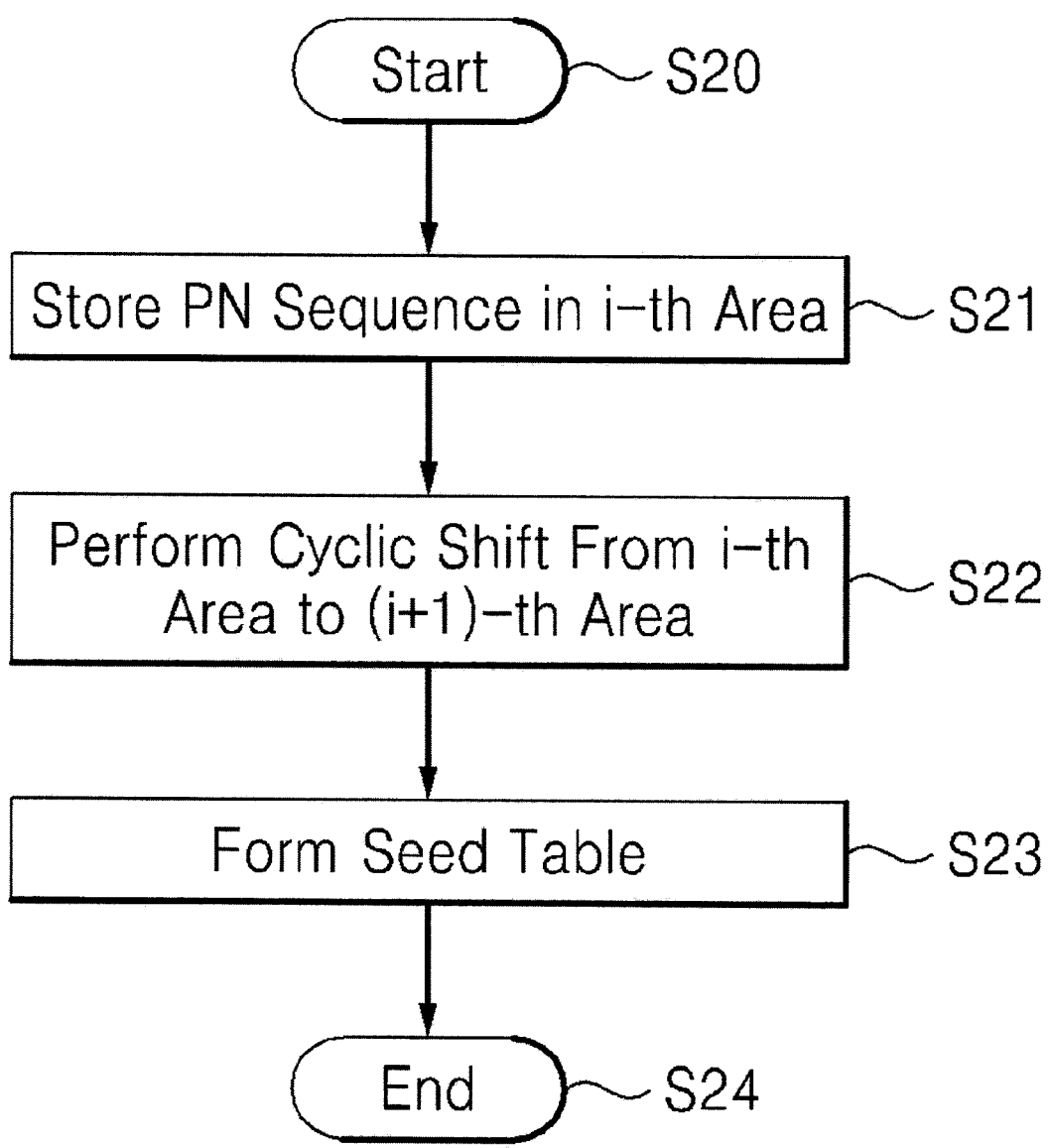
FIG. 2 is a flowchart of a procedure for forming a seed table according to some example embodiments.

FIG. 2 is a flowchart of a procedure for forming a seed table according to example embodiments.

Referring to FIG. 2, a pseudo-random number or pseudo noise (PN) sequence received from a PN sequence generator is stored in an i-th area of a seed table in operation S21.

In detail, the PN sequence is provided from the PN sequence generator and the i-th area of the seed table in which the PN sequence is stored may be located in a volatile memory device (e.g., random access memory (RAM)) or a non-volatile memory device (e.g., read-only memory (ROM)) within a controller. This will be described in detail with reference to FIG. 6 later.

The PN sequence may be provided in binary bits from the PN sequence generator. The PN sequence stored in the i-th area is cyclically shifted to an (i+1)-th area in operation S22. When cyclic shift is performed on the PN sequence stored in the memory device, a seed table including at least one seed unit is formed in operation S23.

In detail, the seed table includes a plurality of row areas and a plurality of column areas. Each of the row areas in the seed table includes as many binary bits as the number of LFSRs included in the randomizer 10 illustrated in FIG. 1, which will be described with reference to FIGS. 5 and 6 later. In other words, a single row area in the seed table may be a single seed unit. The seed unit includes as many binary bits as the order of a randomizer.

The seed unit may correspond to a page address of a non-volatile memory device. In detail, the non-volatile memory device includes a plurality of blocks and each block includes a plurality of pages. Blocks are data erase units in which data is erased in the non-volatile memory device. Pages are data program and/or read units in which data is programmed and/or read in the non-volatile memory device.

In other words, the seed table may include as many seeds as the number of addresses respectively indicating a plurality of pages included in a single block of the non-volatile memory device. The seed table may also include as many seeds as the number of addresses respectively indicating all pages included in a plurality of blocks in the non-volatile memory device. Accordingly, cyclic shifting of the PN sequence is repeated until every row area in the seed table is filled with a seed.

Referring to FIG. 2, that a randomizer randomizes data using a seed table formed by performing cyclic shift on a PN sequence is effective in increasing the randomness in which a pattern is different between bit line strings in a block of a non-volatile memory device. Accordingly, randomizing using the seed table enables data of non-volatile memory cells to be randomized in both row and column directions, thereby increasing the reliability of the non-volatile memory device.

Figure 3:
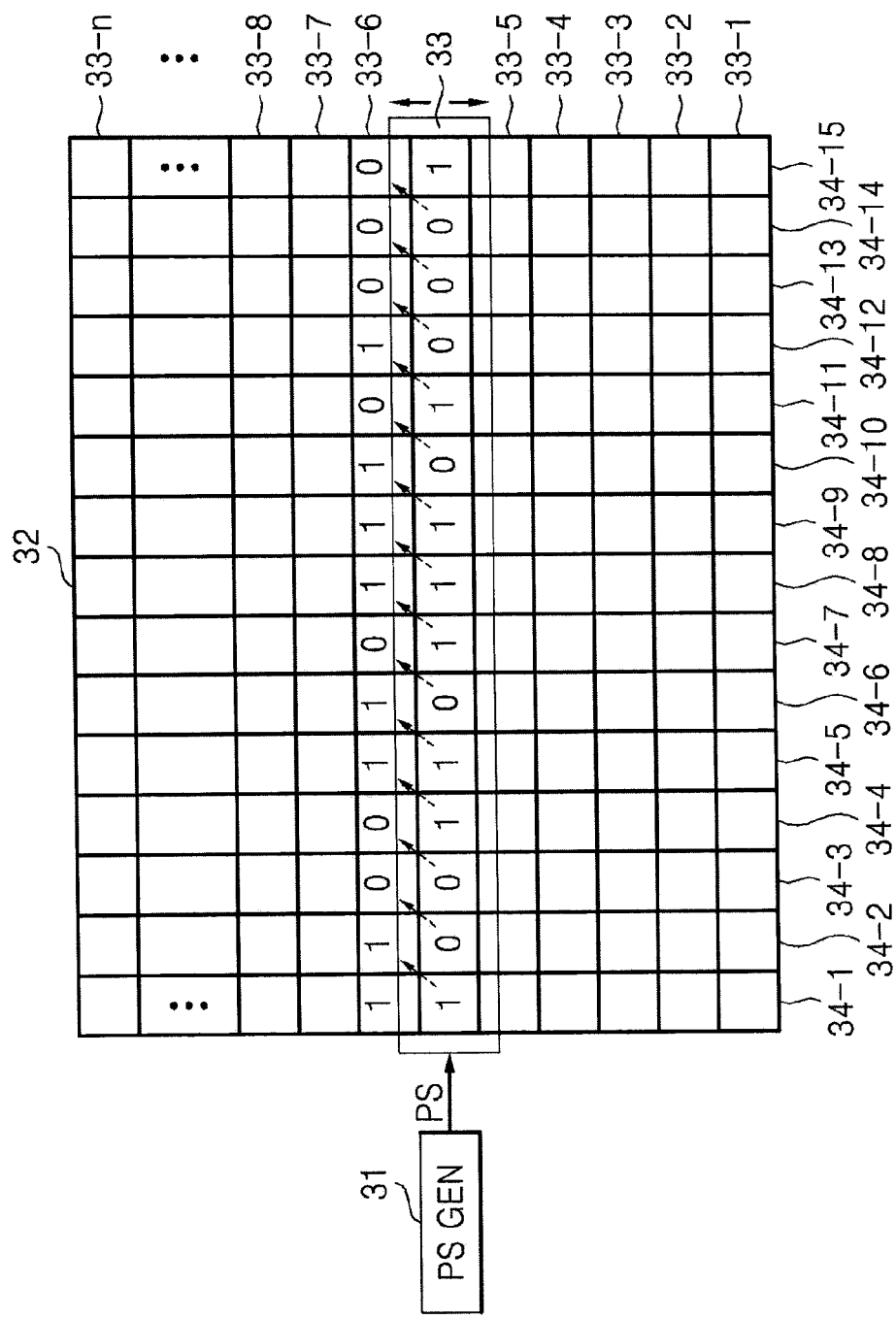
FIG. 3 is a conceptual diagram showing an example of forming a seed table according to the flowchart illustrated in FIG. 2.

FIG. 3 is a conceptual diagram showing an example of forming a seed table according to the flowchart illustrated in FIG. 2.

FIG. 3 shows the procedure in which a seed table 32 is formed using a PN sequence PS provided from a PN sequence generator 31. Referring to FIG. 3, the PN sequence generator 31 and the seed table 32 are illustrated together.

The PN sequence generator 31 includes a plurality of LFSRs. The PN sequence generator 31 will be described in detail with reference to FIG. 5 later. The seed table 32 may be formed in a matrix including a plurality of row areas 33 and 33-1 through 33-$n$ and a plurality of column areas 34-1 through 34-15.

Referring to FIGS. 2 and 3, the PN sequence generator 31 provides the PN sequence PS. The PN sequence PS provided from the PN sequence generator 31 is stored in the i-th row area 33 of the seed table 32.

Referring to FIG. 3, the i-th row area 33 is at least one of the row areas 33 and 33-1 through 33-$n$ of the seed table 32. The i-th row area 33 may include at least one seed unit. Binary bits (e.g., 100110111010001) stored in the i-th row area 33 forms a single seed unit used by a randomizer, which will be described in detail with reference to FIGS. 6 and 7 later.

Referring to FIGS. 2 and 3, the PN sequence PS stored in the i-th row area 33 is cyclically shifted to the (i+1)-th row area 33-5 or 33-6. The (i+1)-th row area 33-5 or 33-6 may be a row area adjacent to the i-th row area 33. Accordingly, cyclic shift may be performed from the i-th row area 33 to the (i+1)-th row area 33-5 or 33-6 adjacent to the i-th row area 33.

Referring to FIG. 3, the (i+1)-th row area may be the row area 33-6 adjacent to the i-th row area 33 in an upward direction or the row area 33-5 adjacent to the i-th row area 33 in a downward direction. Accordingly, the cyclic shift is performed from the i-th row area 33 to the upwardly adjacent (i+1)-th row area 33-6 or the downwardly adjacent (i+1)-th row area 33-5. The cyclic shift may be performed by M bits where M is a natural number. In detail, M is a natural number greater than or equal to 1 and less than the number of the column areas 34-1 through 34-15 of the seed table 32.

For instance, if M is 1, then bits stored in the i-th row area 33 are shifted to the (i+1)-th row area 33-5 or 33-6 bit by bit to the left or right. Referring to FIG. 3, when M is 1, cyclically shifted bits (e.g., 110011011101000) may be stored in the (i+1)-th row area 33-6.

Each of the row areas 33 and 33-1 through 33-n in the seed table 32 includes a single seed unit including binary bits corresponding to the order of a randomizer. The seed unit corresponds to the number of page addresses in a non-volatile memory device.

The non-volatile memory device includes a plurality of blocks each of which includes a plurality of pages. The blocks are data erase units of the non-volatile memory device and the pages are data program and/or read units of the non-volatile memory device.

In detail, the seed table 32 may include as many seed units as the number of page addresses respectively indicating a plurality of pages included in a single block of the non-volatile memory device. The seed table 32 may also include as many seed units as the number of page addresses respectively indicating all pages included in the plurality of blocks. In other words, the seed table 32 may include as many row areas 33 and 33-1 through 33-n as the number of page addresses respectively corresponding to a plurality of pages included in at least one block of the non-volatile memory device.

Accordingly, cyclic shift of the PN sequence PS may be repeated until a seed is formed in each of all row areas 33 and 33-1 through 33-n of the seed table 32.

In detail, the PN sequence PS is cyclically shifted from the i-th row area 33 to the (i+1)-th row area 33-5 or 33-6. A PN sequence stored in the (i+1)-th row area 33-5 or 33-6 as a result of the cyclic shift from the i-th row area 33 is cyclically shifted to the (i+2)-th row area 33-4 or 33-7. The (i+2)-th row area may be the row area 33-4 or 33-7 adjacent to the (i+1)-th row area 33-5 or 33-6. A PN sequence stored in the (i+2)-th row area 33-4 or 33-7 as a result of the cyclic shift may be cyclically shifted to the (i+3)-th row area 33-3 or 33-8.

Figure 4:
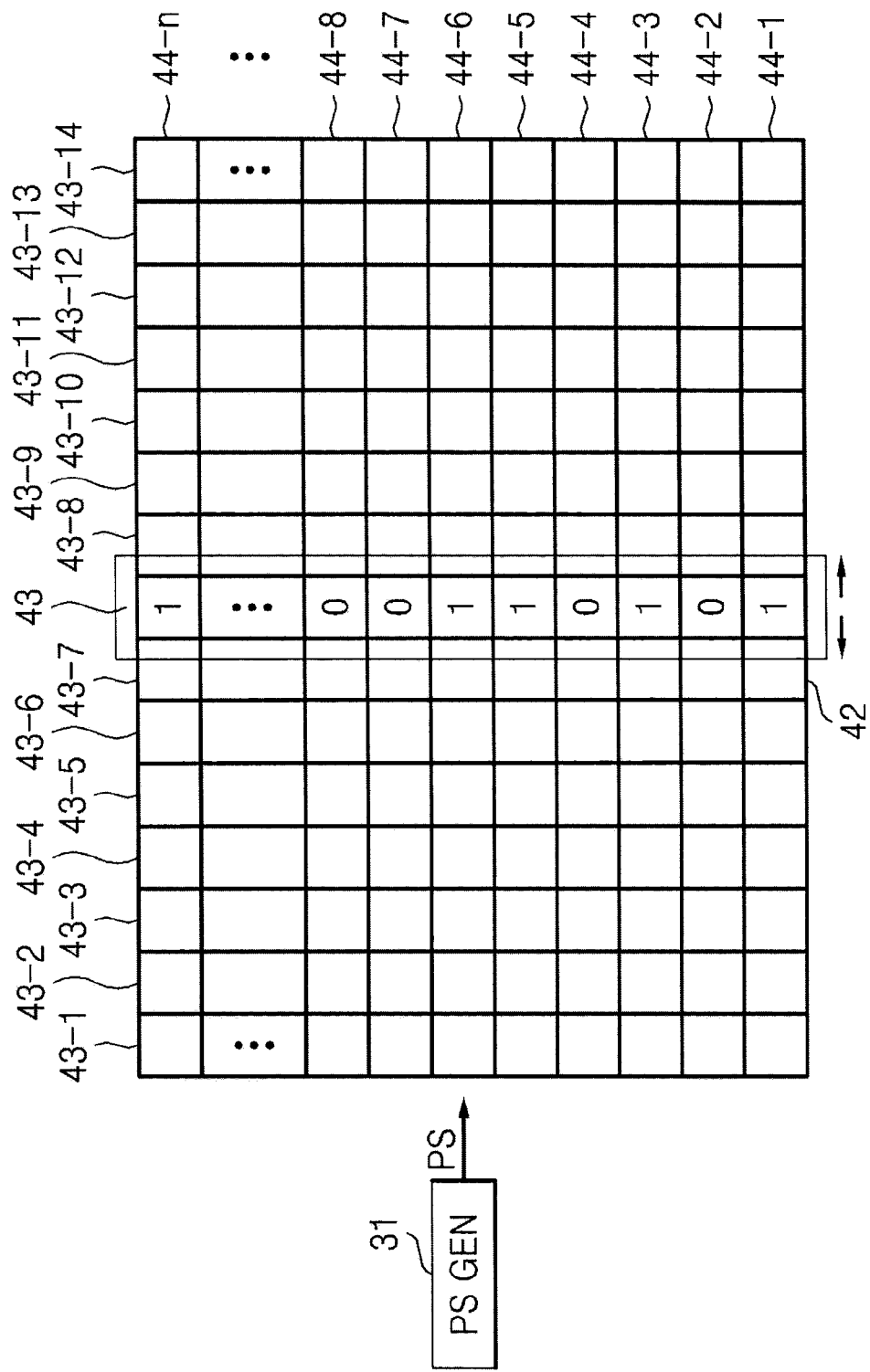
FIG. 4 is a conceptual diagram showing another example of forming a seed table according to the flowchart illustrated in FIG. 2.

FIG. 4 is a conceptual diagram showing another example of forming a seed table according to the flowchart illustrated in FIG. 2.

FIG. 4 shows the procedure in which a seed table 42 is formed using a PN sequence PS provided from the PN sequence generator 31. Referring to FIG. 4, the PN sequence generator 31 and the seed table 42 are illustrated together.

The PN sequence generator 31 includes a plurality of LFSRs. The PN sequence generator 31 will be described in detail with reference to FIG. 5 later. The seed table 42 may be formed in a matrix including a plurality of row areas 44-1 through 44-n and a plurality of column areas 43 and 43-1 through 43-14.

Referring to FIGS. 2 and 4, the PN sequence generator 31 provides the PN sequence PS. The PN sequence PS provided from the PN sequence generator 31 is stored in the i-th column area 43 of the seed table 42. The i-th column area 43 is at least one of the column areas 43 and 43-1 through 43-14 of the seed table 42. The seed table 42 includes column areas 43 and 43-1 through 43-14 corresponding to the order of a randomizer. Referring to FIG. 4, the PN sequence PS stored in the i-th column area 43 includes "n" binary bits.

Referring to FIGS. 2 and 4, the PN sequence PS stored in the i-th column area 43 is cyclically shifted to the (i+1)-th column area 43-7 or 43-8. The (i+1)-th column area 43-7 or 43-8 may be a column area adjacent to the i-th column area 43. Accordingly, cyclic shift may be performed from the i-th column area 43 to the adjacent (i+1)-th column area 43-7 or 43-8.

Referring to FIG. 4, the (i+1)-th column area 43-7 or 43-8 may be the column area 43-7 adjacent to the i-th column area 43 in a left direction or the column area 43-8 adjacent to the i-th column area 43 in a right direction. The cyclic shift may be performed by M bits where M is a natural number. In detail, M is a natural number greater than or equal to 1 and less than the number of the column areas 43 and 43-1 through 43-14 of the seed table 42.

For instance, if M is 1, then bits stored in the i-th column area 43 are shifted to the (i+1)-th column area 43-7 or 43-8 bit by bit to the left or right.

Referring to FIG. 4, the seed table 42 includes the "n" row areas 44-1 through 44-n. As described above with reference to FIG. 3, a single row may form a single seed unit. Referring to FIG. 4, each of the row areas 44-1 through 44-n in the seed table 42 includes a single seed unit including binary bits corresponding to the order of the randomizer.

The seed unit corresponds to a page address in a non-volatile memory device. The non-volatile memory device includes a plurality of blocks each of which includes a plurality of pages. The blocks are data erase units of the non-volatile memory device and the pages are data program and/or read units of the non-volatile memory device.

In detail, the seed table 42 may include as many seed units as the number of page addresses respectively indicating a plurality of pages included in at least one block included in the non-volatile memory device. In other words, the seed table 42 may include the row areas 44-1 through 44-n as many as the number of page addresses respectively corresponding to the plurality of pages included in a single block of the non-volatile memory device.

The seed table 42 may also include seed units corresponding to the number of page addresses related with a plurality of blocks in the non-volatile memory device. Accordingly, the i-th column area 43, i.e., the at least one column area of the seed table 42 may include as many binary bits as the number of page addresses respectively indicating pages included in the blocks of the non-volatile memory device.

Accordingly, cyclic shift of the PN sequence PS may be repeated until a seed is formed in each of all row areas 44-1 through 44-n of the seed table 42.

In detail, the PN sequence PS is cyclically shifted from the i-th column area 43 to the (i+1)-th column area 43-7 or 43-8. A PN sequence stored in the (i+1)-th column area 43-7 or 43-8 as a result of the cyclic shift from the i-th column area 43 is cyclically shifted to the (i+2)-th column area 43-6 or 43-9.

The (i+2)-th column area may be the column area 43-6 or 43-9 adjacent to the (i+1)-th column area 43-7 or 43-8. A PN sequence stored in the (i+2)-th column area 43-6 or 43-9 as a result of the cyclic shift may be cyclically shifted to the (i+3)-th column area 43-5 or 43-10. The cyclic shift to the (i+3)-th column area 43-5 or 43-10 is performed in the same manner as described above. The cyclic shift may be performed by M bits.

Figure 5:
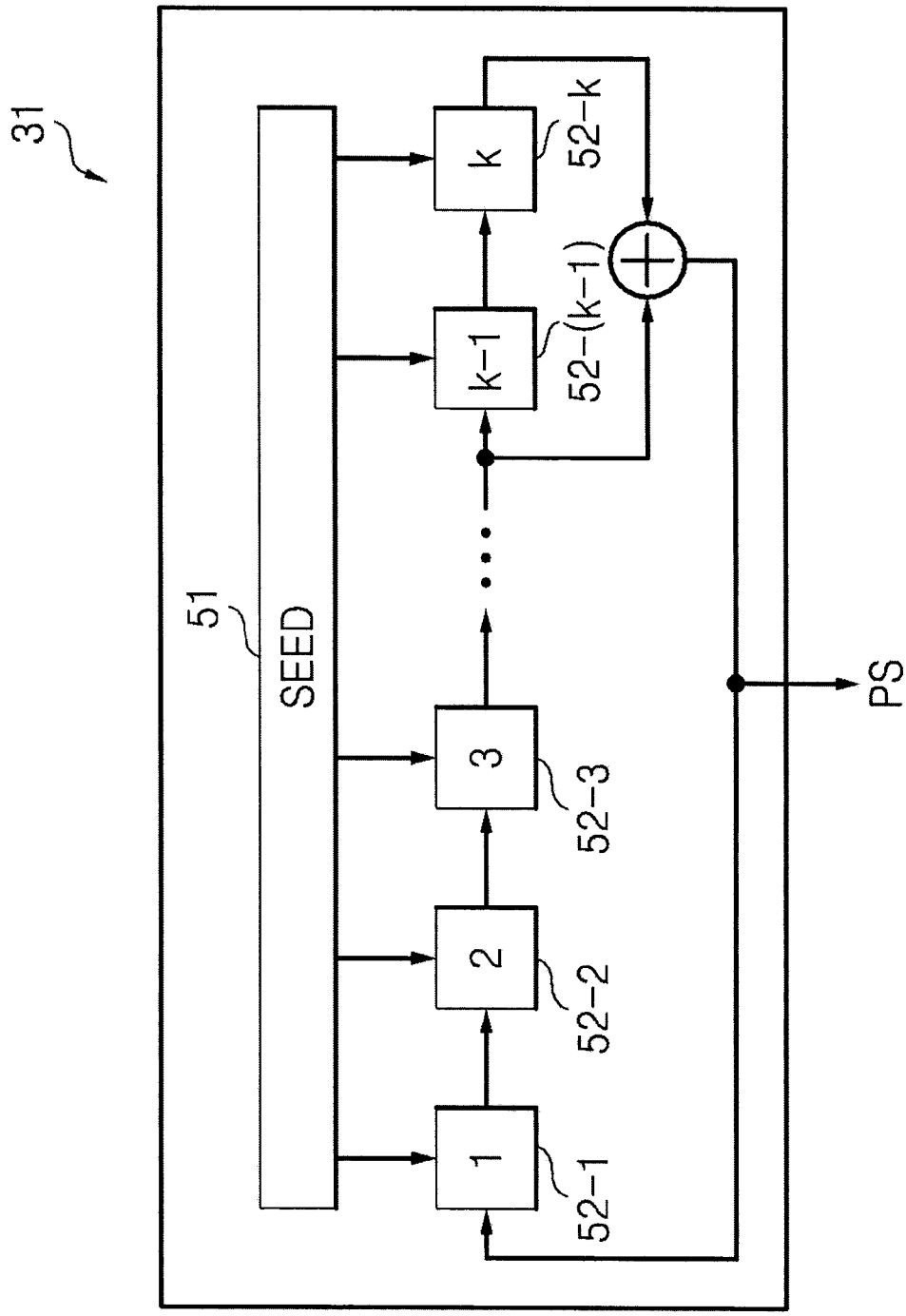
FIG. 5 is a block diagram of a pseudo noise (PN) sequence generator illustrated in FIG. 3 or 4.

FIG. 5 is a block diagram of the PN sequence generator 31 illustrated in FIG. 3 or 4. The PN sequence generator 31 includes a plurality of LFSRs 52-1 through 52-k.

When the number of the LFSRs 52-1 through 52-k included in the PN sequence generator 31 is "k" (where "k" is a natural number), the PN sequence PS may have a period of $(2^k-1)$. The period of the PN sequence PS may be changed depending on the number of LFSRs.

When a long PN sequence PS is formed, many LFSRs are used. The period of the PN sequence PS may be controlled by adjusting the number of LFSRs. An initial value referred to as a seed 51 is stored in each of the LFSRs 52-1 through 52-k. The PN sequence generator 31 forms the PN sequence PS using the initial value.

Figure 6:
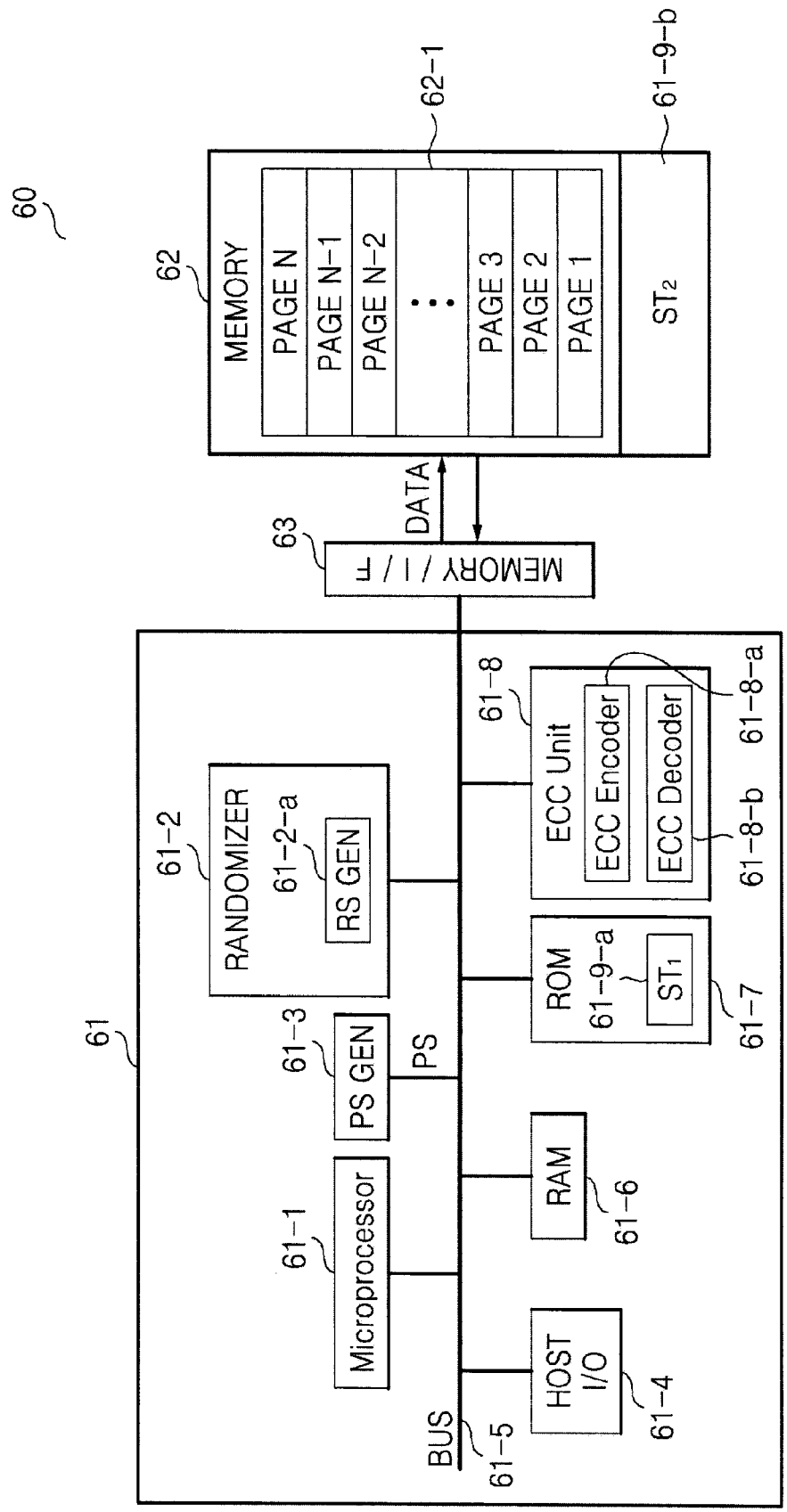
FIG. 6 is a block diagram of a memory system according to some example embodiments.

FIG. 6 is a block diagram of a memory system 60 according to example embodiments. The memory system 60 includes a controller 61, a non-volatile memory device 62, and a memory interface 63.

The non-volatile memory device 62 may be implemented by flash memory, electrically erasable programmable ROM (EEPROM), ferroelectric RAM (FRAM), phase-change RAM (PRAM), or magnetoresistive RAM (MRAM). NAND flash memory is illustrated as the non-volatile memory device 62 in FIG. 6, the present inventive concepts is not restricted to the current embodiments.

Referring to FIG. 6, the non-volatile memory device 62 may function as a storage unit which stores data provided from the controller 61. The non-volatile memory device 62 may store a seed table 61-9-b formed according to example embodiments. Accordingly, the non-volatile memory device 62 may also be a seed table storage unit. As described above with reference to FIGS. 2 through 4, the non-volatile memory device 62 includes a plurality of blocks.

For clarity of the description, only a single block 62-1 among the plurality of blocks included in the non-volatile memory device 62 is illustrated in FIG. 6. The block 62-1 includes a plurality of pages PAGE1 through PAGEN. As described above with reference to FIGS. 2 through 4, the block 62-1 is a unit of an erase operation of the non-volatile memory device 62 and each of the pages PAGE1 through PAGEN is a unit of a program and/or read operation of the non-volatile memory device 62. The pages PAGE1 through PAGEN correspond to different page addresses, respectively.

Referring to FIGS. 3, 4, and 6, each row area in seed tables 61-9-a and 61-9-b corresponds to a page address. In detail, the seed table 61-9-a or 61-9-b may include as many seeds as the number of page addresses respectively indicating the pages PAGE1 through PAGEN of the block 62-1 included in the non-volatile memory device 62. In other words, the seed table 61-9-a or 61-9-b may include as many row areas as the number of page addresses respectively indicating the pages PAGE1 through PAGEN of the block 62-1 included in the non-volatile memory device 62.

The controller 61 includes a microprocessor 61-1, RAM 61-6, ROM 61-7, an error correction code (ECC) unit 61-8, a randomizer 61-2, a PN sequence generator 61-3, and a host input/output (I/O) unit 61-4. The elements 61-1 through 61-4 and 61-6 through 61-8 of the controller 61 can communicate with one another through a bus 61-5. The randomizer 61-2 includes a random sequence generator 61-2-a.

The microprocessor 61-1, which may be implemented by a circuit, a logic, a code or a combination thereof, controls the overall operation of the memory system 60 including the controller 61. When power is applied to the memory system 60, the microprocessor 61-1 loads firmware, which has been stored in the ROM 61-7 for the operation of the memory system 60, into the RAM 61-6, thereby controlling the overall operation of the memory system 60. The microprocessor 61-1 also may analyze a command output from a host and control the overall operation of the non-volatile memory device 62 according to an analysis result.

The ROM 61-7 may store an operation firmware code of the memory system 60, but the present inventive concept is not restricted to the current embodiments. The operation firmware code may be stored in the non-volatile memory device 62 such as a NAND flash memory device apart from the ROM 61-7. Accordingly, the control or intervention of the microprocessor 61-1 may include control of the firmware that is software driven by the microprocessor 61-1 as well as direct hardware control by the microprocessor 61-1.

The ROM 61-7 may also store the seed table 61-9-a formed according to example embodiments. The ROM 61-7 may include a seed table storage.

The RAM 61-6 functions as a buffer and may store commands, data and variables, which are input through the host I/O unit 61-4 or data output from the non-volatile memory device 62. The RAM 61-6 may also store data, parameters and variables input to or output from the non-volatile memory device 62.

The host I/O unit 61-4 may perform interface between the host and the memory system 60 including the controller 61 according to a predetermined protocol.

The host I/O unit 61-4 which may function as a host interface may communicate with the external host using universal serial bus (USB), small computer system interface (SCSI), peripheral component interconnect express (PCI-express), advanced technology attachment (ATA), parallel ATA (PATA), serial ATA (SATA), or serial attached SCSI (SAS).

The ECC unit 61-8 performs error bit correction. The ECC unit 61-8 includes an ECC encoder 61-8-a and an ECC decoder 61-8-b.

The ECC encoder 61-8-a performs error correction encoding on data received through the host I/O unit 61-4 of the memory system 60 and generates data including parity bits. The parity bits may be stored in the non-volatile memory device 62.

The ECC decoder 61-8-b performs error correction decoding on data output from the non-volatile memory device 62 using parity bits, determines whether the error correction decoding has been successful according to the result of the decoding, and outputs an indication signal according to a determination result. In other words, read data is transmitted to the ECC decoder 61-8-b and the ECC decoder 61-8-b corrects error bits in the read data using parity bits.

When the number of error bits in the data is greater than the number of correctable error bits, the ECC decoder 61-8-b cannot correct the error bits and generates a signal indicating error correction fail. The ECC encoder 61-8-a and the ECC decoder 61-8-b use a low density parity check (LDPC) code, a Bose, Chaudhuri, and Hocquenghem (BCH) code, a turbo code, a Reed-Solomon code, a convolution code, a recursive systematic code (RSC), or a coded modulation such as a trellis-coded modulation (TCM) or a block coded modulation (BCM) to perform error correction on data.

The ECC encoder 61-8-a and the ECC decoder 61-8-b may include any one of circuits, systems and devices for error correction.

Figure 7:
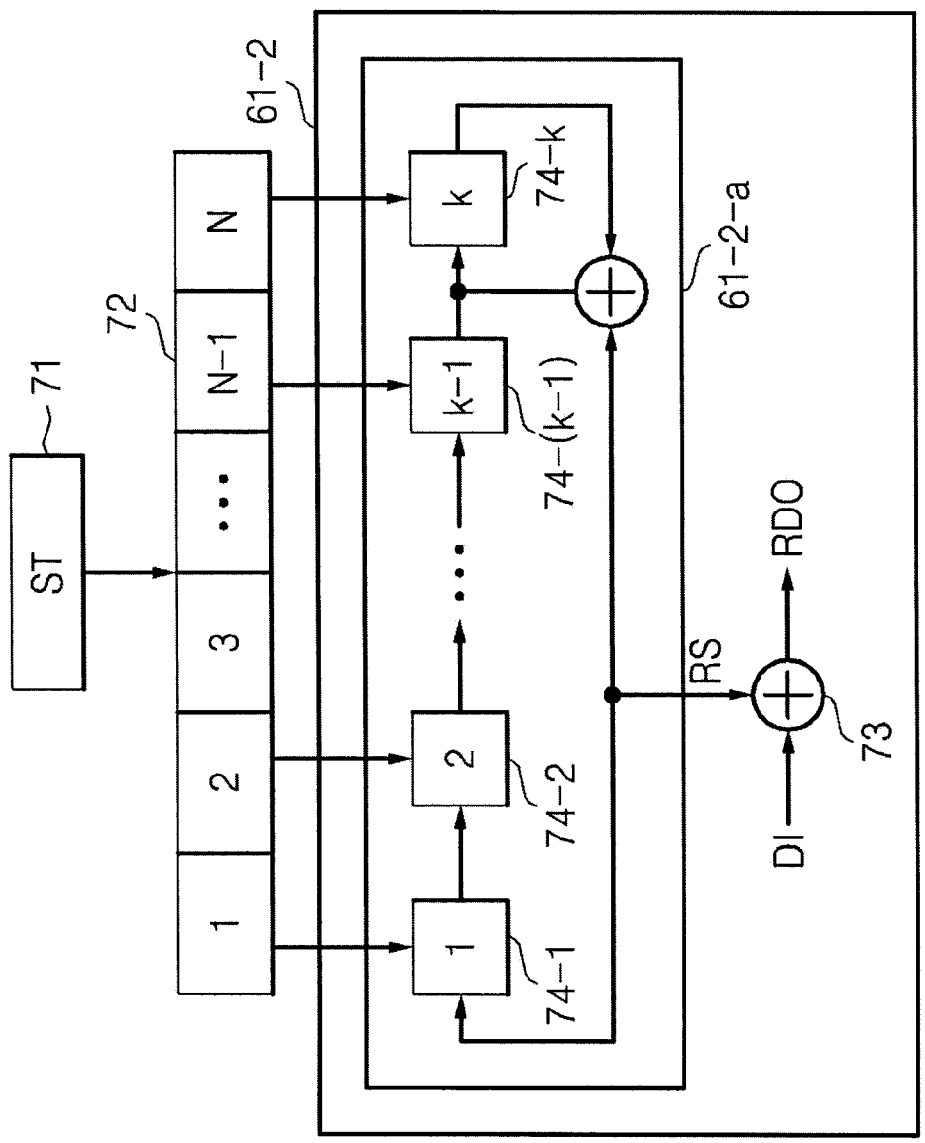
FIG. 7 is a block diagram of a randomizer illustrated in FIG. 6.

Referring to FIG. 7, the randomizer 61-2 includes a random sequence generator 61-2-a and a logic gate 73.

The random sequence generator 61-2-a includes a plurality of LFSRs 74-1 through 74-k. When the number of the LFSRs 74-1 through 74-k is "k", a random sequence RS may have a period of $(2^k-1)$. Here, "k" also indicates the order of the randomizer 61-2. An initial value referred to as a seed is stored in each of the LFSRs 74-1 through 74-k. The random sequence generator 61-2-a generates a random sequence RS using the seed and provides the random sequence RS to the logic gate 73.

The logic gate 73 is an XOR gate in the embodiments illustrated in FIG. 7 but is not restricted thereto. The logic gate 73 performs an XOR operation on the random sequence RS from the random sequence generator 62-1-a and input data DI and generates random data RDO.

The randomizer 61-2 changes the input data DI so that the numbers of 1s and 0s in the input data DI are maintained constant stochastically, thereby increasing the reliability of data stored in the non-volatile memory device 62.

The PN sequence generator 61-3 provides a PN sequence PS used to form the seed table(s) 61-9-*a* and/or 61-9-*b* according to some embodiments. The structure of the PN sequence generator 61-3 may substantially be the same as that of the PN sequence generator 31 illustrated in FIG. 3 or 4.

The memory interface 63 may perform interface between the controller 61 and the non-volatile memory device 62. The memory interface 63 may be implemented within the controller 61 in other embodiments.

A command of the microprocessor 61-1 may be provided to the non-volatile memory device 62 through the memory interface 63 and data may be transmitted from the controller 61 to the non-volatile memory device 62 through the memory interface 63. In addition, data output from the non-volatile memory device 62 may be provided to the controller 61 through the memory interface 63.

As described above with reference to FIGS. 2, 3 and 4, the PN sequence PS may be provided to the RAM 61-6 or the ROM 61-7 according to the control or intervention of the microprocessor 61-1; and cyclic shift is performed on the PN sequence PS to form the seed table(s) 61-9-*a* and/or 61-9-*b*. The cyclic shift may be performed by M bits where M is a natural number greater than or equal to 1. The seed table 61-9-*a* or 61-9-*b* formed by performing cyclic shift on the PN sequence PS may be stored in the ROM 61-7 or the non-volatile memory device 62.

Referring to FIG. 7, the randomizer 61-2 stores a seed unit 72 in the LFSRs 74-1 through 74-*k* implemented in the random sequence generator 61-2-*a* with reference to a seed table 71 stored in the seed table storage, e.g., the ROM 61-7 or the non-volatile memory device 62, and forms a random sequence RS using the seed unit 72. The seed table 71 may be the seed table 61-9-*a* stored in the ROM 61-7 or the seed table 61-9-*b* stored in the non-volatile memory device 62.

The randomizer 61-2 is provided with a single seed unit 72 with reference to the seed table 61-9-*a* or 61-9-*b* stored in the ROM 61-7 or the non-volatile memory device 62 and stores the seed unit 72 in the LFSRs 74-1 through 74-*k*. The random sequence generator 61-2-*a* provides the random sequence RS using the seed unit 72 stored in the LFSRs 74-1 through 74-*k*.

The logic gate 73 performs the logic operation on the random sequence RS and the input data DI, thereby randomizing the input data DI into the random data RDO.

Figure 8:
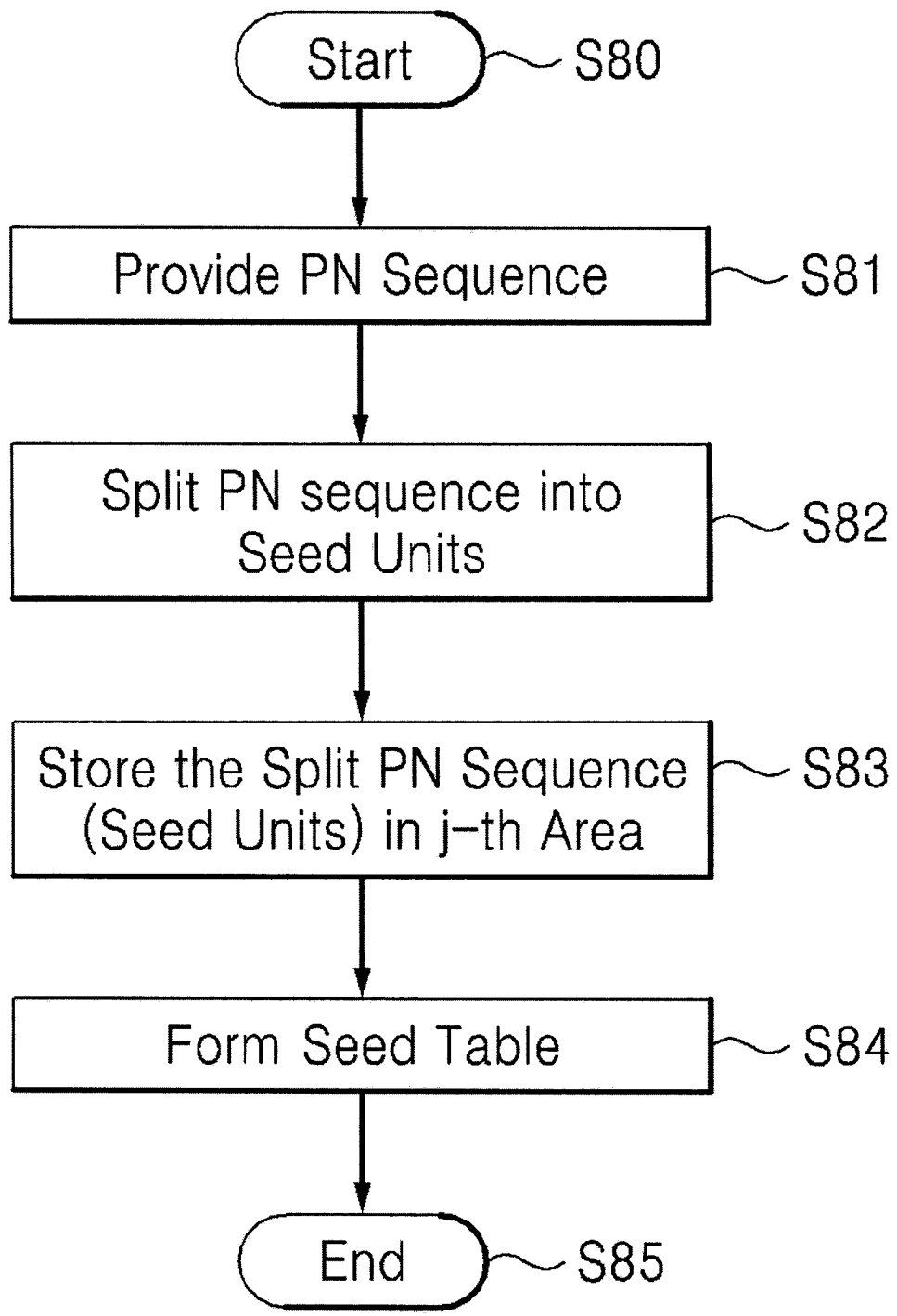
FIG. 8 is a flowchart of a procedure for forming a seed table according to some example embodiments.
Figure 9:
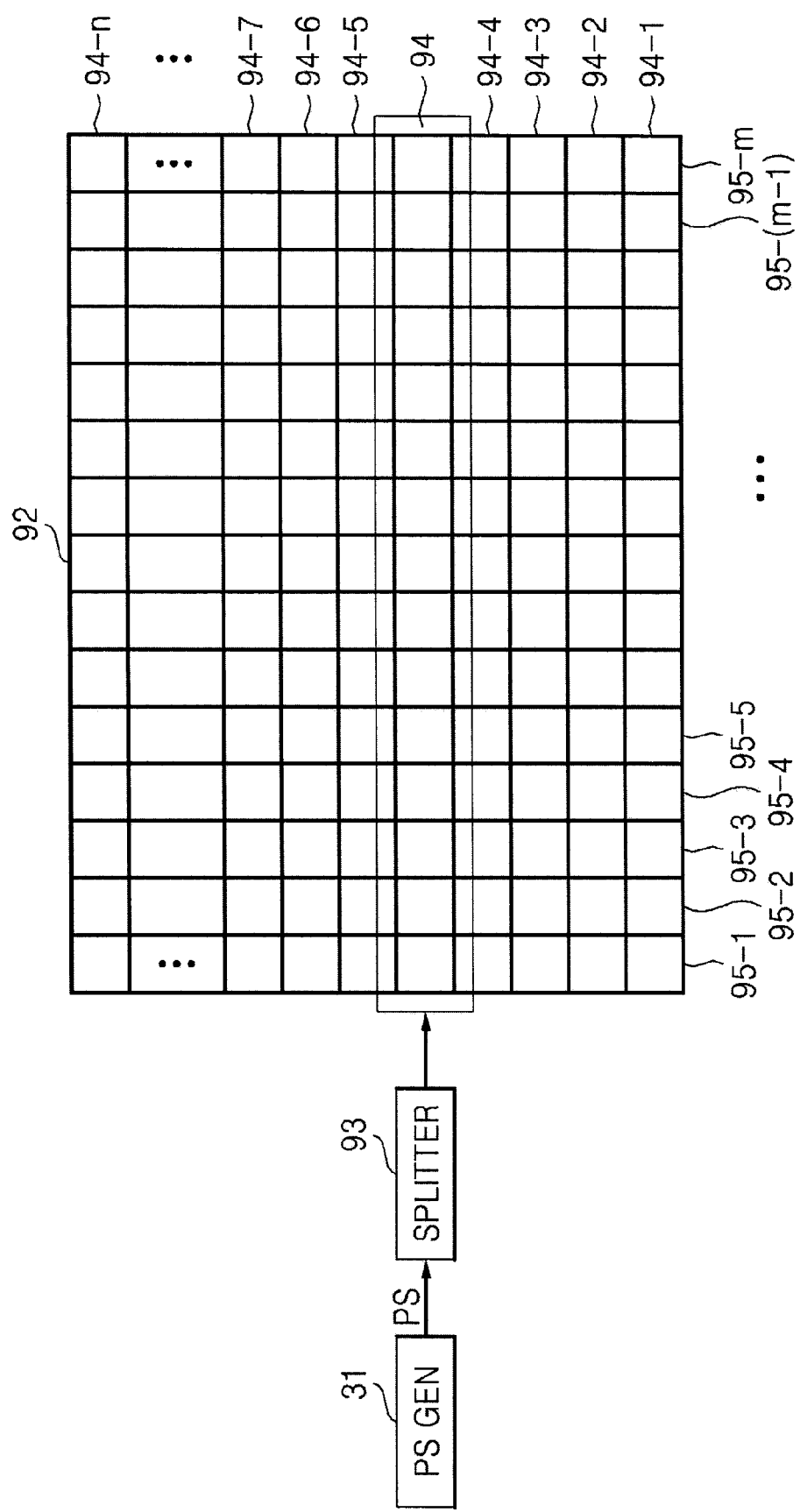
FIG. 9 is a conceptual diagram showing an example of forming a seed table according to the flowchart illustrated in FIG. 8.

FIG. 8 is a flowchart of a procedure for forming a seed table according to example embodiments. FIG. 9 is a conceptual diagram showing an example of forming the seed table according to the flowchart illustrated in FIG. 8.

Referring to FIGS. 6 through 8, the PN sequence generator 61-3 provides a PN sequence PS in operation S81. The PN sequence PS is split into seed units in operation S82. A split PN sequence is stored in a j-th area in the seed table in operation S83. Each of PN sequence stored in the j-th area of the seed table form a seed table including a single seed unit in operation S84.

Referring to FIG. 9, the PN sequence generator 31 and a seed table 92 are illustrated together.

Referring to FIGS. 8 and 9, the PN sequence generator 31 provides a PN sequence PS to a sequence splitter 93. The sequence splitter 93 splits the PN sequence PS into seed units used in a randomizer. The seed unit is binary bits corresponding to the order of a random sequence generator and corresponding to the number of LFSRs included in the random sequence generator.

Each PN sequence in a seed unit is stored in a j-th area 94 of the seed table 92 in operation S83. The seed table 92 includes a plurality of column areas 95-1 through 95-*m* and a plurality of row areas 94 and 94-1 through 94-*n*. The j-th area 94 is at least one row area in the seed table 92. The j-th area 94 corresponds to a single seed unit used by the random sequence generator. The randomizer needs a seed unit including binary bits as many as the order of the random sequence generator or as the number of LFSRs included in the random sequence generator.

Referring to FIGS. 6 and 9, the seed table 92 includes a plurality of the row areas 94 and 94-1 through 94-*n* and the "m" column areas 95-1 through 95-*m*. Each of the row areas 94 and 94-1 through 94-*n* forms a single seed unit. Here, "n" is the number of addresses respectively indicating a plurality of pages included in a single block of the non-volatile memory device 62 and "m" corresponds to the order of the random sequence generator including an LFSR.

Each of the row areas 94 and 94-1 through 94-*n* in the seed table 92 corresponds to a page address of each of the pages included in a block of the non-volatile memory device 62. In detail, the seed table 92 may include as many seed units as the number of addresses respectively indicating the pages included in a block of the non-volatile memory device 62. In other words, the seed table 92 may include as many row areas as the number of a plurality of page addresses related with a block in the non-volatile memory device 62.

Accordingly, the sequence splitter 93 receiving the PN sequence PS from the PN sequence generator 31 may split the PN sequence PS into sections as many as the number of page addresses corresponding to a single block of the non-volatile memory device 62. The sections of the split PN sequence PS may be stored in the row areas 94 and 94-1 through 94-*n*, respectively, in the seed table 92. Consequently, the seed table 92 is completed.

Figure 10:
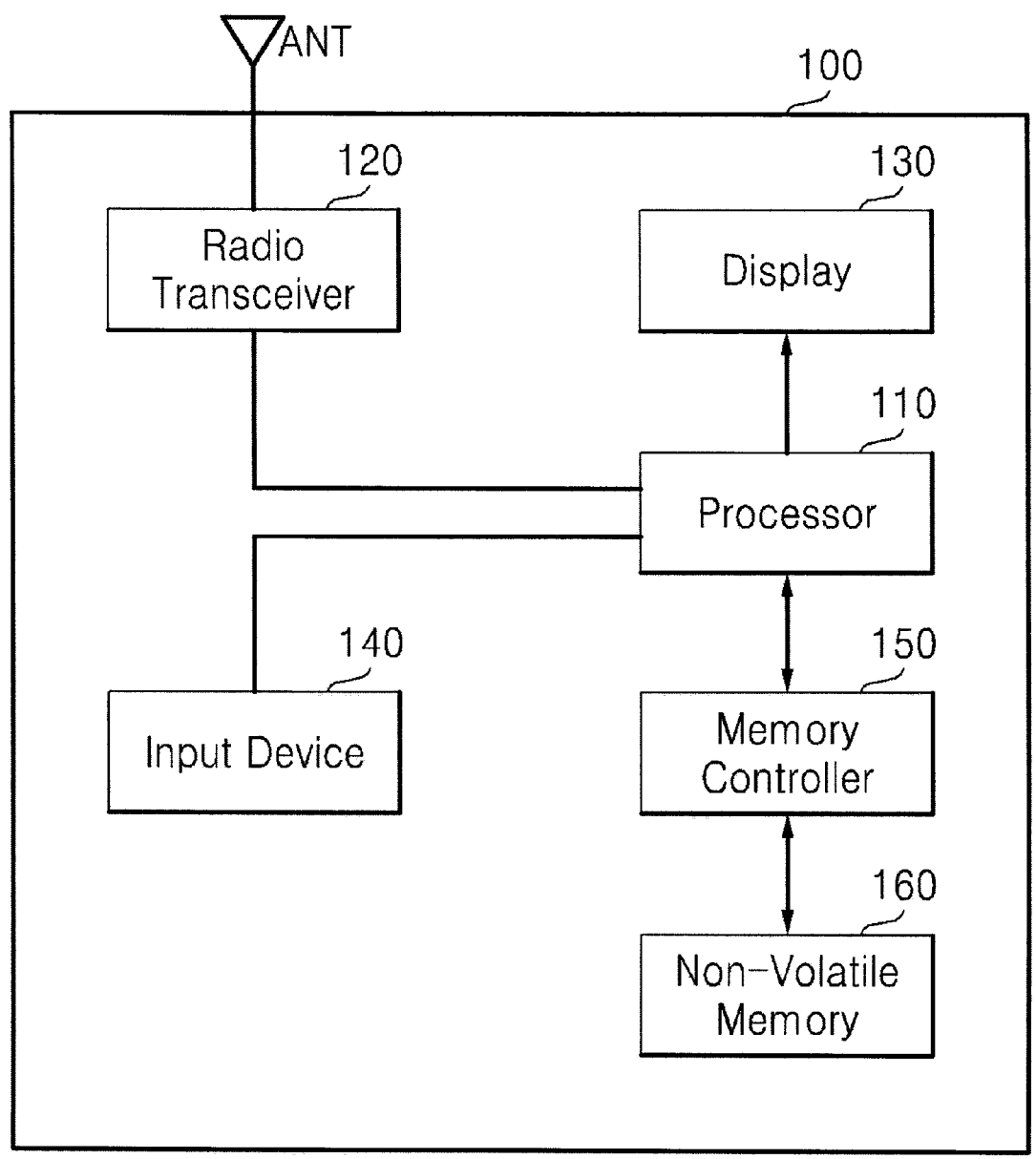
FIG. 10 is a block diagram of an electronic system including a non-volatile memory device according to some example embodiments.

FIG. 10 is a block diagram of an electronic system 100 including a non-volatile memory device 160 according to some embodiments. Referring to FIG. 10, the electronic system 100 such as a cellular phone, a smart phone or a tablet personal computer (PC) may include the non-volatile memory device 160, which may be implemented by a flash memory device, and a memory controller 150 controlling the operation of the non-volatile memory device 160.

The non-volatile memory device 160 may be the non-volatile memory device 62 illustrated in FIG. 6 and the memory controller 150 may be the controller 61 illustrated in FIG. 6. At this time, the memory controller 150 may form the seed table 32, 42 or 92 used by a randomizer, as has been described with reference to FIGS. 2 through 4 and FIGS. 8 and 9.

The memory controller 150 is controlled by a processor 110 which controls the overall operation of the electronic system 100.

Data stored in the non-volatile memory device 160 may be displayed through a display 130 according to the control of the memory controller 150 controlled by the processor 110.

A radio transceiver 120 may transmit or receive radio signals through an antenna ANT. The radio transceiver 120 may convert radio signals received through the antenna ANT into signals that can be processed by the processor 110. Accordingly, the processor 110 may process the signals output from the radio transceiver 120 and store the processed signals in the non-volatile memory device 160 through the memory controller 150 or display them in the display 130. The radio transceiver 120 may also convert signals output from the processor 110 into radio signals and outputs the radio signals to an external device through the antenna ANT.

An input device 140 enables control signals for controlling the operation of the processor 110 or data to be processed by the processor 110 to be input to the electronic system 100. The input device 140 may be implemented by a pointing device such as a touch pad or a computer mouse, a keypad, or a keyboard.

The processor 110 may control the display 130 to display data output from the non-volatile memory device 160, radio signals output from the radio transceiver 120, or data output from the input device 140.

Figure 11:
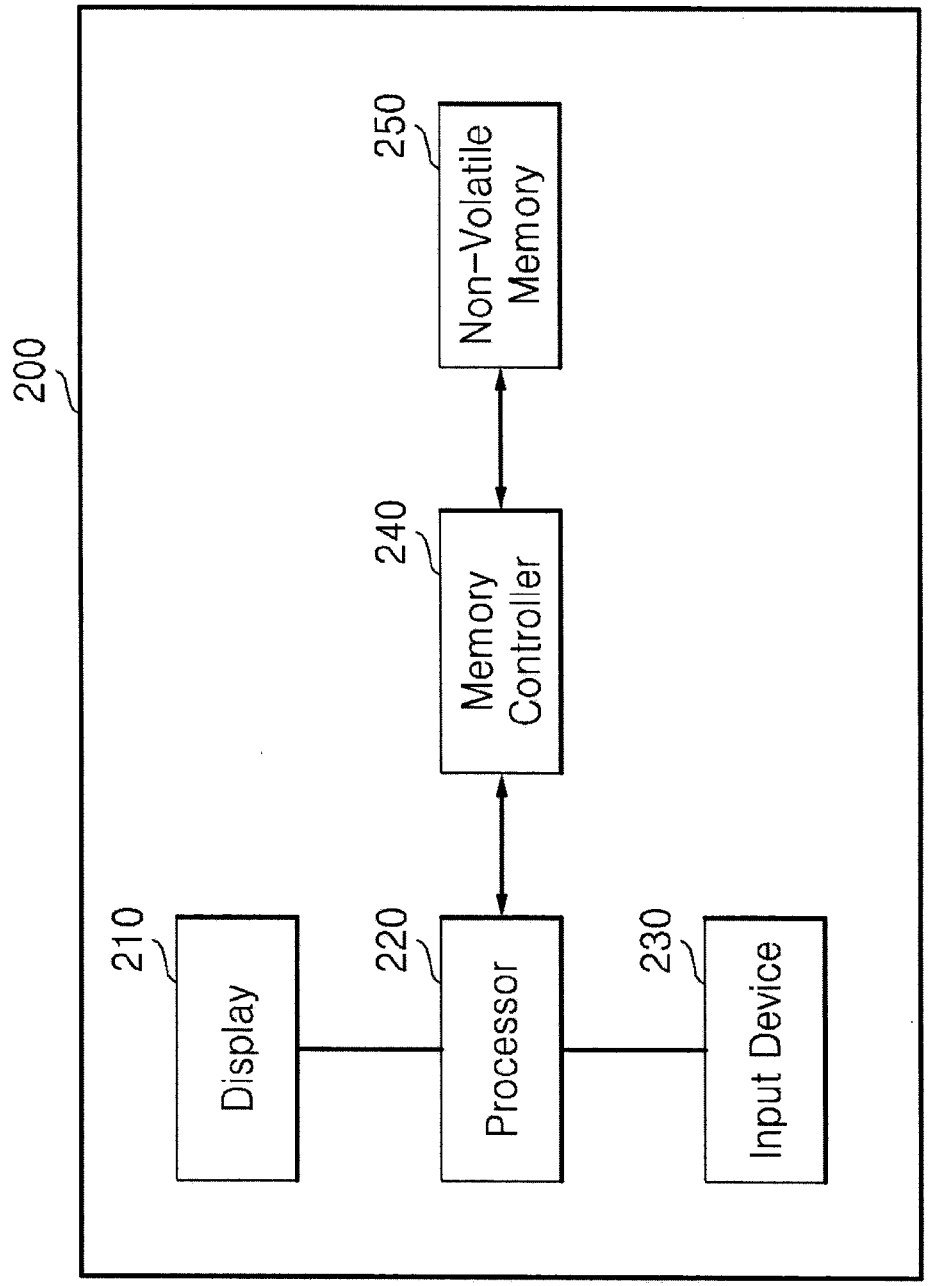
FIG. 11 is a block diagram of an electronic system including a non-volatile memory device according to some example embodiments.

FIG. 11 is a block diagram of an electronic system 200 including a non-volatile memory device 250 according to other embodiments. Referring to FIG. 11, the electronic system 200 may be implemented by a data processing system such as a PC, a tablet PC, a netbook, an e-reader, a personal digital assistant (PDA), a portable multimedia player (PMP), an MP3 player, or an MP4 player. The electronic system 200 includes the non-volatile memory device 250, which may be implemented by a flash memory device, and a memory controller 240 controlling the operation of the non-volatile memory device 250.

The non-volatile memory device 250 may be the non-volatile memory device 62 illustrated in FIG. 6 and the memory controller 240 may be the controller 61 illustrated in FIG. 6. At this time, the memory controller 240 may form the seed table 32, 42 or 92 used by a randomizer, as has been described with reference to FIGS. 2 through 4 and FIGS. 8 and 9.

The electronic system 200 may also include a processor 220 which controls the overall operation of the electronic system 200. The memory controller 240 is controlled by the processor 220.

The processor 220 may display data stored in the non-volatile memory device 250 through a display 210 according to an input signal generated in an input device 230. Like the input device 140 illustrated in FIG. 10, the input device 230 may be implemented by a pointing device such as a touch pad or a computer mouse, a keypad, or a keyboard.

Figure 12:
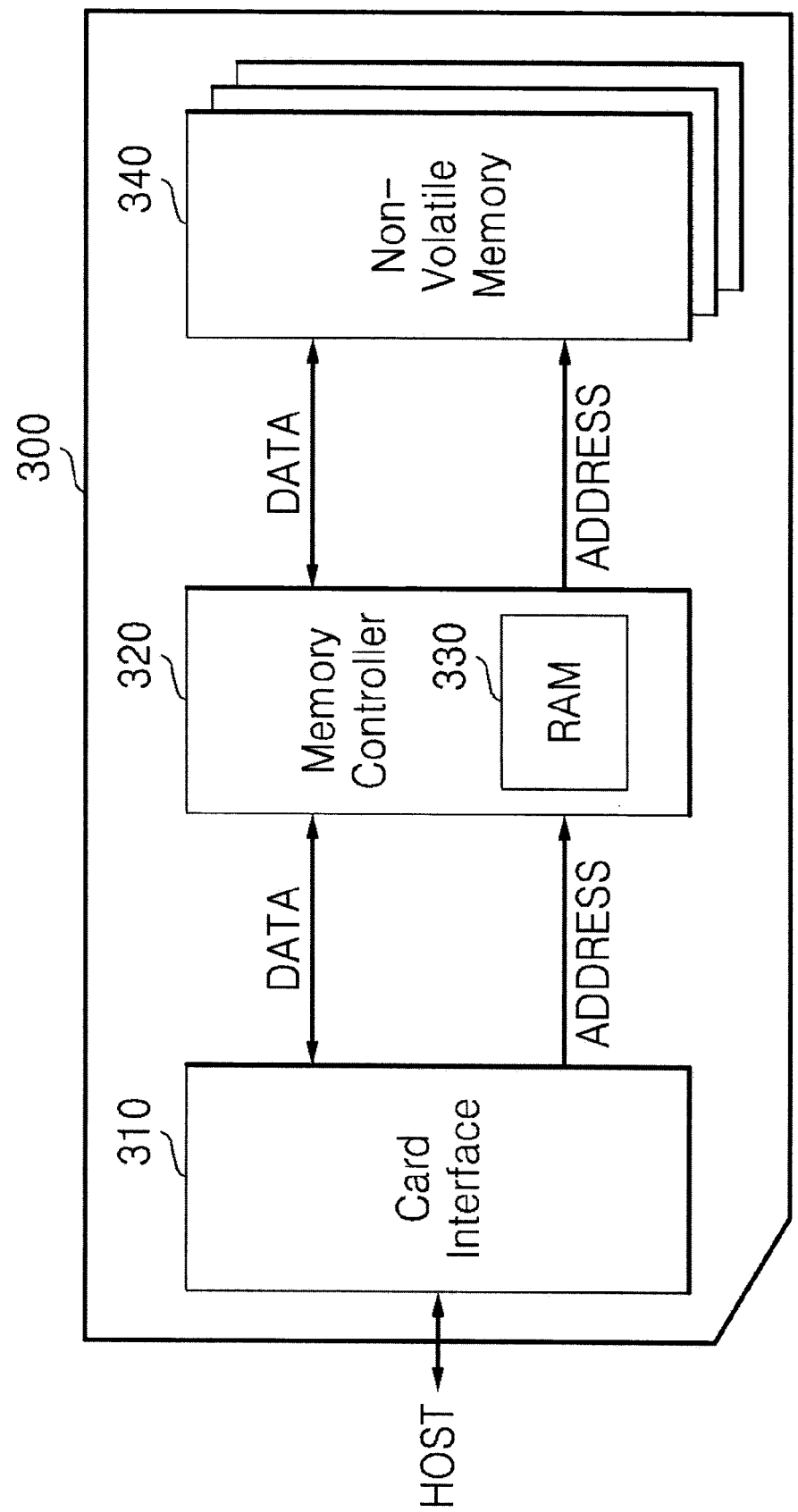
FIG. 12 is a block diagram of an electronic system including a non-volatile memory device according to some example embodiments.

FIG. 12 is a block diagram of an electronic system 300 including a non-volatile memory device 340 according to further embodiments. Referring to FIG. 12, the electronic system 300 includes a card interface 310, a memory controller 320, and the non-volatile memory device 340, e.g., a flash memory device.

The electronic system 300 may perform data communication with a host HOST using the card interface 310. The card interface 310 may be a secure digital (SD) card interface or a multimedia card (MMC) interface, but the present invention is not restricted thereto. The card interface 310 may perform data communication between the host and the memory controller 320 according to a communication protocol of the host that can communicate with the electronic system 300.

The memory controller 320 performs functions the same as or similar to those of the controller 61 illustrated in FIG. 6. The memory controller 320 may also control the overall operation of the electronic system 300 and control the data exchange between the card interface 310 and the non-volatile memory device 340.

The non-volatile memory device 340 may be the non-volatile memory device 62 illustrated in FIG. 6.

A RAM 330 included in the memory controller 320 may store various kinds of data for controlling the overall operation of the electronic system 300. The memory controller 320 may be connected with the non-volatile memory device 340 through a data bus DATA and an address bus ADDRESS.

In addition, the memory controller 320 may receive or transmit read data or write data through the data bus DATA connected to the card interface 310 and the non-volatile memory device 340.

When the memory system 300 is connected with the host such as a PC, a tablet PC, a digital camera, a digital audio player, a cellular phone, a console video game hardware, or a digital set-top box, the host may perform data communication with the non-volatile memory device 340 through the card interface 310 and the memory controller 320.

Figure 13:
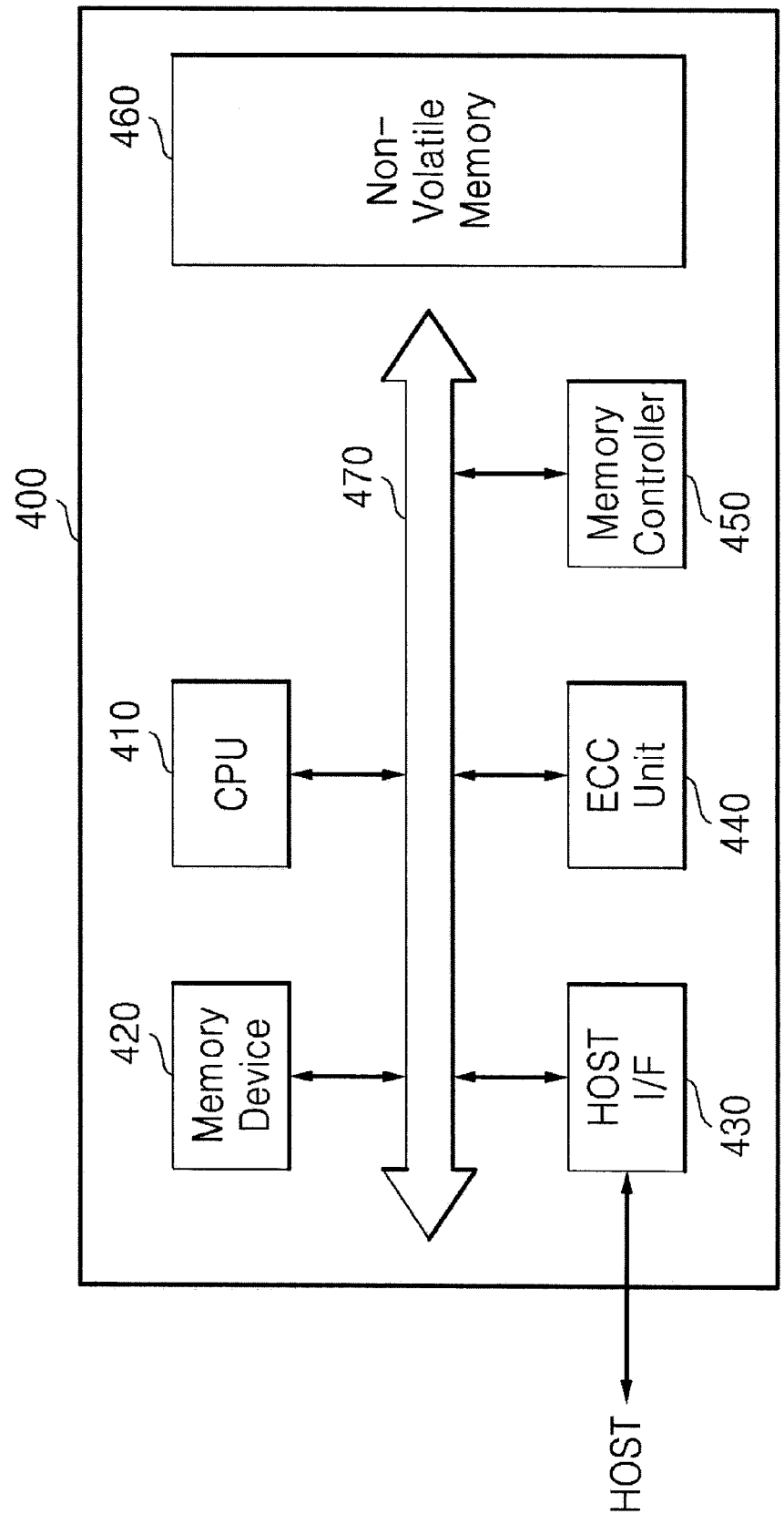
FIG. 13 is a block diagram of an electronic system including a non-volatile memory device according to some example embodiments.

FIG. 13 is a block diagram of an electronic system 400 including a non-volatile memory device 460 according to other embodiments. Referring to FIG. 13, the electronic system 400 includes the non-volatile memory device 460 like a flash memory device, a memory controller 450 controlling the operation of the non-volatile memory device 460, and a central processing unit (CPU) 410 controlling the overall operation of the electronic system 400.

The electronic system 400 also includes a memory device 420 that may be used as an operation memory of the CPU 410. The memory device 420 may be implemented by non-volatile memory like ROM or volatile memory like dynamic RAM (DRAM).

A host HOST connected with the electronic system 400 may perform data communication with the non-volatile memory device 460 through a host interface 430, a bus 470, and the memory controller 450. At this time, the memory controller 450 may function as a memory interface suitable for the non-volatile memory device 460.

The memory controller 450 may perform functions the same as or similar to those of the controller 61 illustrated in FIG. 6. The non-volatile memory device 460 may be the non-volatile memory device 62 illustrated in FIG. 6.

The electronic system 400 may also include an ECC unit 440. The ECC unit 440 which operates according to the control of the CPU 410 detects and corrects an error bit included in data read from the non-volatile memory device 460 through the memory controller 450.

The CPU 410 may control data communication among the memory device 420, the host interface 430, the ECC unit 440, and the memory controller 450 through the bus 470.

The electronic system 400 may be implemented as a USB flash memory drive or a memory stick.

Interference between data values, i.e., data patterns of memory cells can be minimized by storing randomized data, i.e., random data in memory. Flash memory cells in non-volatile memory devices, e.g., flash memory devices may have interference such as program voltage disturbance, pass voltage disturbance, coupling between floating poly gates and/or back pattern dependency.

A randomizer randomizes input data to minimize the interference between flash memory cells, thereby increasing the reliability of a non-volatile memory device. However, when a seed is repeatedly used, there may be a problem in randomizing data patterns of non-volatile memory cells in a column direction although data patterns of non-volatile memory cells in a row direction are randomized.

According to some embodiments, a seed table including a plurality of seeds that enable data of non-volatile memory cells to be randomized in the column direction as well as the row direction is formed, thereby increasing the reliability of a non-volatile memory device.

While example embodiments have been particularly shown and described, it will be understood by those of ordinary skill in the art that various changes in form and details may be made therein without departing from the spirit and scope of the present invention as defined by the following claims.

What is claimed is:

1. A method for operating a controller, the method comprising:
storing a pseudo noise (PN) sequence provided from a PN sequence generator in an i-th area of a seed table; and
cyclically shifting, by the controller, the PN sequence from the i-th area adjacent to an (i+1)-th area in the seed table to form the seed table that includes at least one seed unit;
wherein the seed table includes a plurality of row areas and a plurality of column areas,
wherein a number of the column areas in the seed table is greater than or equal to an order of a randomizer of the controller that includes at least one linear feedback shift register, and
wherein at least one of the column areas includes binary bits corresponding to a number of page addresses indicating a plurality of pages of at least one block in a non-volatile memory device.

2. The method of claim 1, wherein the plurality of row areas in the seed table includes the at least one seed unit.

3. The method of claim 1, wherein the number of the column areas in the seed table is equal to the order of the randomizer of the controller that includes the at least one linear feedback shift register.

4. The method of claim 1, wherein only one of the column areas includes the binary bits corresponding to the number of page addresses indicating the plurality of pages of the at least one block in the non-volatile memory device.

5. The method of claim 1, wherein the i-th area is at least one area among the column areas, and
wherein the PN sequence stored in the i-th area forms a single column in the seed table.

6. The method of claim 1, wherein the number of the column areas in the seed table is greater than the order of the randomizer of the controller.

7. The method of claim 1, wherein the at least one of the column areas includes the binary bits corresponding to the number of page addresses indicating the plurality of pages of all blocks in the non-volatile memory device.

8. The method of claim 1, wherein the column areas include the binary bits corresponding to the number of page addresses indicating the plurality of pages of all blocks in the non-volatile memory device.

9. The method of claim 1, wherein the order of the randomizer of the controller is equal to a number of linear feedback shift registers in the randomizer.

* * * * *